United States Patent [19]

Paeglis et al.

[11] Patent Number: 5,569,516
[45] Date of Patent: Oct. 29, 1996

[54] MEMBRANE AND MIXTURE COMPRISING A THERMOPLASTIC ELASTOMER

[76] Inventors: Arnis U. Paeglis, 35 Foxhill La., Hillsborough, N.J. 08876; Robert L. Boysen, 41 Philhower Rd., Lebanon, N.J. 08833; Timothy R. Lynn, RD 3 Box 23, Hackettstown, N.J. 07840; Jeffrey D. Collins, 72 Starling Dr., Branchburg, N.J. 08876

[21] Appl. No.: 398,571

[22] Filed: Mar. 3, 1995

[51] Int. Cl.$^6$ .............................. B32B 25/16; B32B 3/00

[52] U.S. Cl. .............................. 428/58; 428/57; 428/141; 428/143; 428/147; 428/489; 428/500; 428/521; 156/71; 156/308.4; 526/282; 526/283; 526/308; 526/336; 526/339; 524/70; 524/71; 524/570; 524/574; 524/579

[58] Field of Search ............................... 428/57, 58, 141, 428/143, 192, 500, 521, 147; 156/71, 308.4; 526/336, 339, 282, 283, 308; 524/70, 71, 570, 574, 579

[56] References Cited

U.S. PATENT DOCUMENTS

| | | | |
|---|---|---|---|
| 3,378,606 | 4/1968 | Kontos | 260/878 |
| 3,758,643 | 9/1973 | Fischer | 260/897 |
| 3,919,358 | 11/1975 | Batiuk et al. | 260/897 |
| 4,132,698 | 1/1979 | Gessler et al. | 260/33.6 |
| 4,589,804 | 5/1986 | Paeglis et al. | 405/270 |
| 5,082,908 | 1/1992 | Imai et al. | 526/143 |
| 5,162,436 | 11/1992 | Davis et al. | 525/97 |
| 5,229,478 | 7/1993 | Floyd et al. | 526/336 X |
| 5,256,228 | 10/1993 | Davis et al. | 156/157 |
| 5,260,111 | 11/1993 | Valaitis et al. | 428/57 |
| 5,332,793 | 7/1994 | Cann | 526/133 X |

OTHER PUBLICATIONS

Paeglis et al., Thermoplastic Elastomer Compounds From Sulfonated EPDM Ionomers, Rubber Chemistry and Technology, vol. 61, pp. 223 to 237.

*Primary Examiner*—Fred Teskin
*Attorney, Agent, or Firm*—Saul R. Bresch

[57] ABSTRACT

A thermoplastic elastomer consisting essentially of a copolymer comprising a mixture of ethylene; one or more alpha-olefins having 3 to 12 carbon atoms; and, optionally, a diene, said copolymer being in an uncrosslinked state and having a crystallinity in the range of about 2 to about 40 percent by weight based on the weight of the copolymer wherein about 15 to about 85 percent by weight of the crystallinity melts at a temperature above 80° C.; about 15 to about 85 percent by weight of the crystallinity melts at a temperature below 80° C.; and the crystalline melting temperatures differ by at least about 30° C.

5 Claims, No Drawings

MEMBRANE AND MIXTURE COMPRISING A THERMOPLASTIC ELASTOMER

TECHNICAL FIELD

This invention relates to (i) copolymers of ethylene and alpha-olefins and (ii) ethylene/propylene copolymer rubbers (EPRs), which include ethylene/propylene copolymers (EPMs) and ethylene/propylene/ethylidene norbornene terpolymers (EPDMs). A characteristic of the polymers of this invention is that they are not crosslinked, but exhibit the properties of crosslinked thermoplastic elastomers.

BACKGROUND INFORMATION

Conventional EPRs are elastomeric polymers used in such applications as single ply roofing, hose and tubing, wire and cable, automotive weatherstripping, and gaskets. They are generally formulated with fillers, oils, processing aids, and stabilizing agents, and can be cured with organic peroxides such as dicumyl peroxide or by reacting the EPDMs with sulfur in the presence of accelerators. Commercially available EPRs require vulcanization to produce desirable mechanical properties suitable for practical use. These EPRs have relatively low crystalline contents and have relatively low melting points, e.g., melting points in the 40° C. to 60° C. range, which make them unsuitable for use at elevated temperatures without crosslinking. In order to improve unvulcanized mechanical properties, the EPRs are often blended with thermoplastics such as polyethylene or polypropylene.

Thermoplastic elastomers bear a resemblance to EPRs in that they are rubbery materials. A unique characteristic of thermoplastic elastomers is that they can be thermoformed by techniques generally associated with thermoplastic resins. Thermoplastic elastomers normally contain elastomeric domains and crystalline or partially crystalline thermoplastic domains. The elastomeric phase lends rubbery properties, while the relatively hard thermoplastic phase provides strength below the melting point of the thermoplastic elastomer and good processability above the melting point. When the elastomeric phase is crosslinked, the method of crosslinking must be selective to the elastomer so as to avoid crosslinking the thermoplastic phase, and thus retain its beneficial processability.

It would be advantageous to be able to provide a polymer, whether a polyethylene or an EPR, which does not have to be crosslinked yet exhibits the desirable physical properties of crosslinked thermoplastic elastomers including high strength over a wide range of use temperatures and shows good processability over a wide range of processing temperatures.

DISCLOSURE OF THE INVENTION

An object of this invention, therefore, is to provide a polymer, which has the positive attributes of polyethylene or an EPR together with those of a thermoplastic elastomer. Other objects and advantages will become apparent hereinafter.

According to the present invention, the above object is met by a thermoplastic elastomer consisting essentially of a copolymer comprising a mixture of ethylene; one or more alpha-olefins having 3 to 12 carbon atoms; and, optionally, a diene, said copolymer being in an uncrosslinked state and having a crystallinity in the range of about 2 to about 40 percent by weight based on the weight of the copolymer wherein about 15 to about 85 percent by weight of the crystallinity melts at a temperature above 80° C.; about 15 to about 85 percent by weight of the crystallinity melts at a temperature below 80° C.; and the crystalline melting temperatures differ by at least about 30° C.

DESCRIPTION OF THE PREFERRED EMBODIMENT(S)

The copolymers of ethylene and one or more alpha-olefins, which include the EPRs, can be made with vanadium based catalyst systems, which are exemplified by the catalyst systems described in U.S. Pat. No. 4,508,842, as modified below. Titanium based catalyst systems such as those described in U.S. Pat. Nos. 4,302,565 and 5,290,745 can also be used.

A typical catalyst system, useful in preparing the thermoplastic elastomer of this invention, comprises:

(A) a catalyst precursor comprising:
  (i) a vanadium compound, which is the reaction product of
    (a) $VX_3$ wherein each X is independently chlorine, bromine, or iodine; and
    (b) an electron donor, which is a liquid, organic Lewis base in which $VX_3$ is soluble;
  (ii) a modifier having the formula $BX_3$ or $AlR_{(3-a)}X_a$ wherein each R is independently alkyl having 1 to 14 carbon atoms; each X is as defined above; and a is 1 or 2; and
  (iii) a support for said vanadium compound and modifier;
(B) a cocatalyst consisting essentially of a compound having the formula $AlR_{(3-a)}X_a$ wherein R, X, and a are as defined above; and,
(C) a promoter, which is a chlorinated ester having at least 2 chlorine atoms.

The preferred vanadium trihalide ($VX_3$) is vanadium trichloride. The electron donor is a liquid, organic Lewis base in which the vanadium trihalide is soluble. It is, generally, liquid at temperatures in the range of about 0° C. to about 200° C.

The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic adds having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium compound and electron donor, the reaction product finally contains about 1 to about 20 moles of electron donor per mole of vanadium compound and preferably about 1 to about 10 moles of electron donor per mole of vanadium compound.

The modifier has the formula $BX_3$ or $AlR_{(3-a)}X_a$ wherein each R is independently alkyl having 1 to 14 carbon atoms; each X is independently chlorine, bromine, or iodine; and a is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to vanadium can be in the range of about 1:1 to about 10:1 and is preferably in the range of about 2:1 to about 5:1.

The promoter can be a chlorinated ester having at least 2 chlorine atoms or a perchlorinated ester. Suitable esters are $Cl_3CCOOC_2H_5$ (ethyl trichloroacetate); $Cl_3CCOOCH_3$ (methyl trichloroacetate; $CCl_3CCl=CClCOOC_4H_9$; $C_6H_5CCl_2COOR$ wherein R is an alkyl radical having 1 to 8 carbon atoms; and $Cl_2C=CClCCl_2COOC_4H_9$. About 0.01 to about 10 moles, and preferably about 0.1 to about 2 moles, of promoter can be used per mole of cocatalyst.

The cocatalyst can be a compound having the formula $AlR_{(3-a)}X_a$ wherein each R is independently alkyl having 1 to 14 carbon atoms; each X is independently chlorine, bromine, or iodine; and a is 1 or 2. The total cocatalyst can be present in the catalyst system in an amount of about 10 to about 500 moles of cocatalyst per gram atom of vanadium, and is preferably introduced in an amount of about 30 to about 150 moles of cocatalyst per gram atom of vanadium.

Examples of halogen containing modifiers and cocatalysts are diethylaluminum chloride (preferred); ethylaluminum sesquichloride; di-n-butylaluminum chloride; diisobutylaluminum chloride; methylaluminum sesquichloride; isobutylaluminum sesquichloride; dimethylaluminum chloride; di-n-propylaluminum chloride; methylaluminum dichloride; and isobutylaluminum dichloride.

The support can be inorganic or organic such as silica, alumina, or polymeric; silica is preferred. Examples of polymeric supports are a porous crosslinked polystyrene and polypropylene. A typical silica or alumina support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of vanadium per gram of support and preferably about 0.4 to about 0.9 millimole of vanadium per gram of support. Impregnation of the above mentioned catalyst precursor into a silica support is accomplished by mixing the precursor and silica gel in the electron donor solvent or other solvent followed by solvent removal under reduced pressure.

The modifier is usually dissolved in an organic solvent such as isopentane and impregnated into the support following impregnation of the precursor, after which the supported catalyst precursor is dried. The promoter can also be impregnated into the support in similar fashion, if desired. The cocatalyst and promoter are preferably added separately neat or as solutions in an inert solvent, such as isopentane, to the polymerization reactor at the same time as the flow of ethylene is initiated.

Useful molar ratios for a vanadium based catalyst system are about as follows:

|  | Broad | Preferred |
|---|---|---|
| ED:V (where ED is used) | 1:1 to 20:1 | 1:1 to 10:1 |
| modifier:V | 1:1 to 10:1 | 2:1 to 5:1 |

Specific catalyst systems, which can be used to produce the resins of this invention, will be found below in the examples.

In this specification, the term "copolymer" is considered to mean a polymer based on two or more comonomers such as a terpolymer. The polyethylenes and EPRs of interest here are both copolymers comprising a mixture of ethylene; alpha-olefin; and optionally, a diene. The alpha-olefin monomers can have 3 to 12 carbon atoms, and preferably have 3 to 8 carbon atoms. The dienes can be conjugated or nonconjugated and can contain 4 to 25 carbon atoms. Useful alpha-olefins preferably do not contain any branching on carbon atoms closer than two carbon atoms removed from the double bond. Examples of suitable alpha-olefins include propylene, 1-butene, 1-hexene, 4-methylpentene- 1, 1-heptene, and 1-octene. Examples of the dienes can be found below.

The copolymers can have a density in the range of 0.860 to 0.965 gram per cubic centimeter and a melt index in the range of about 0.001 to about 2500 grams per 10 minutes. Generally, the ethylene/alpha-olefin copolymers will have the higher density and the EPRs the lower density within this range. Melt index is determined under ASTM D- 1238, Condition E, at 190° C. and 2.16 kilograms. Flow index, referred to below, is determined under ASTM D-1238, Condition F, at 190° C. and 21.6 kilograms.

The polymerization can be conducted in the gas phase in the batch or continuous mode. The polymerization is preferably carried out in one or more fluidized bed reactors such as that described in U.S. Pat. No. 4,482,687 or another conventional reactor for the gas phase production of polyolefins. The fluidized bed is usually made up of the particulate resin product. It can be a stirred fluidized bed reactor or a fluidized bed reactor, which is not stirred. The fluidized bed, or other gas phase, reactor can be operated at a temperature in the range of about 35° C. to about 150° C. and is preferably operated at a temperature in the range of about 60° C. to about 110° C. The operating pressure can be in the range of about 150 psig to about 650 psig or higher and is preferably about 250 psig to about 550 psig. The partial pressure of the primary monomer can be in the range of about 20 to about 600 psi and is preferably about 30 to about 300 psi. Additional or secondary monomers can be introduced in a molar ratio of secondary monomer(s) to primary monomer, i.e., ethylene, of up to about 3.5: 1. The alpha-olefin/ethylene molar ratio is adjusted to control the level of alpha-olefin incorporated into the copolymer to achieve the weight percent or mol percent mentioned below. The superficial gas velocity, which can be calculated by measuring cycle gas flow, is, generally, maintained in the range of about 0.1 to about 5 feet per second and is preferably in the range of about 0.5 to about 3.5 feet per second. The gaseous feed streams of monomer(s) and usually hydrogen are preferably fed to the reactor recycle line while liquid comonomer(s) such as dienes, if used, and the cocatalyst solution are preferably fed directly to the fluidized bed reactor to enhance mixing and dispersion. Feeding liquid streams into the reactor recycle line can cause a rapid buildup of a fouling layer resulting in very poor reactor operation. The catalyst precursor (including modifier and support) is, therefore, transferred into the fluidized bed from the catalyst feeder. The composition of the polymer can be varied by changing the comonomer molar ratio in the gas phase and the diene concentration, if used, in the fluidized bed. The product is intermittently discharged from the reactor as the bed level builds up with polymerization. The production rate is controlled by adjusting the catalyst feed rate.

The residence time of the comonomers in the reactor can be in the range of about 1 to about 20 hours and is preferably in the range of about 2 to about 6 hours. Hydrogen or another chain transfer agent can be used in the process. The molar ratio of hydrogen to alpha-olefin used in the fluidized bed reactor can be in the range of about 0.0005:1 to about 3:1 and is preferably in the range of about 0.01:1 to about 2:1. The balance of the operating pressure utilized in the reactor, i.e., after the partial pressure of the monomer(s) and the hydrogen partial pressure are considered, can be made up by using an inert gas such as nitrogen.

The thermoplastic elastomers are produced in crumb or granular form, and this particulate material has a tendency to agglomerate and/or adhere to the polymerization reactor; the storage bins; and the containers used for transporting the elastomeric particles from one location to another at or above polymerization temperatures and/or its softening or sticking temperature. These latter temperatures are described in U.S. Pat. No. 4,994,534. The use of fluidization aids to overcome this problem is suggested in this patent, but this introduces a foreign substance into the thermoplastic elastomer, which, in certain applications, is not acceptable. One solution for this problem is to surface cure the elastomeric particle. This can be accomplished through the use of electron beams. Generally, one reactor will suffice for the production of these thermoplasic elastomers. In the case of the in situ blending of polymers, two or more reactors are needed.

Two types of polymers are considered here, polyethylenes and EPRs. The polyethylenes were described above. The EPRs fall within the broad definition of a copolymer comprising a mixture of ethylene; an alpha-olefin; and, optionally, a diene. The EPRs are either copolymers of ethylene and propylene (EPMs) or terpolymers of ethylene, propylene, and a diene (EPDMs). The dienes can have 4 to 25 carbon atoms and preferably have 6 to 18 carbon atoms. Examples of suitable dienes are straight chain acyclic dienes, branched chain acyclic dienes, single ring dienes, multi-ring dienes, and fused and bridged ring dienes. Specific examples are ethylidene norbornene, 1,4-pentadiene, 1,3-hexadiene, 1,4-octadiene. 1,4-hexadiene, 1,5-hexadiene, dicylcopentadiene, cyclohexadiene, 1-vinyl-1-1-cyclopentene, dicyclopentadiene dimer, 1,6-octadiene, dicyclopentadiene, and 1,5-cyclooctadiene, and the alkylbicyclononadienes, indenes, and norbornenes. Ethylidene norbornene is an example of the latter. The non-conjugated dienes are preferred.

The copolymers of this invention can contain about 60 to about 90 percent by weight ethylene, and preferably contain about 75 to about 90 percent by weight ethylene, based on the weight of the copolymer. They can contain about 10 to about 40 percent by weight propylene or other alpha-olefin based on the weight of the copolymer, and they preferably contain about 10 to about 25 percent by weight of propylene or other alpha-olefin. The amount of diene if included in the copolymer, can be in the range of about 0.1 to about 10 percent by weight diene, and are preferably in the range of about 0.5 to about 5 percent by weight diene, based on the weight of the copolymer.

In terms of mol percent based on the total copolymer, the following ranges can be used:

| monomer | broad range (about) | preferred range (about) |
|---|---|---|
| ethylene | 70 to 95 | 80 to 90 |
| propylene | 5 to 30 | 10 to 20 |
| alpha-olefin | 5 to 30 | 10 to 20 |
| diene | 0.1 to 5 | 0.5 to 2 |

The elastomer can have a crystallinity in the range of about 2 to about 40 percent by weight based on the weight of the elastomer, and preferably has a crystallinity in the range of about 5 to about 30 percent by weight. At least about 15 percent by weight of the crystallinity melts at a temperature above 80° C. This is known as the high melt crystallinity. The high melt crystallinity can be in the range of about 15 to about 85 percent by weight of the crystallinity, and is preferably about 25 to about 75 percent by weight of the crystallinity. At least about 15 percent by weight of the crystallinity melts at a temperature below 80° C. This is known as the low melt crystallinity. The low melt crystallinity can be in the range of about 15 to about 85 percent by weight of the crystallinity, and is preferably about 25 to about 75 percent of the crystallinity. In order to provide the thermoplastic elastomer of this invention, the high and low crystalline melting temperatures must differ by at least about 30° C., and preferably differ by at least about 50° C. High melt crystallinity temperatures are preferably in the range of about 100° to about 135° C., and low melt crystallinity temperatures are preferably in the range of about 40° to about 45° C. Crystallinity is the weight of the crystalline polymer based on the total weight of the polymer. It is reported in percent by weight, and is determined using a Differential Scanning Calorimeter (DSC). High melt crystallinity is the crystalline phase, which melts above 80° C. It is determined from the heat of fusion, $H_f$, above 80° C. measured by the DSC at a heating rate of 10° C. per minute. Low melt crystallinity is the crystalline phase, which melts below 80° C. It is determined from the heat of fusion, $H_f$, below 80° C. measured by the DSC at a heating rate of 10° C. per minute. The ratio by weight of the high melt crystallinity to the low melt crystallinity can be in the range of about 0.2:1 to about 5:1, and is preferably in the range of about 0.5:1 to about 4:1.

Crystallinity can be affected by the presence of diene and/or the promoter/cocatalyst balance.

Steps can be taken to reduce agglomeration of the granular polymer in the reactor. The product discharge line between the reactor and the product pot is often plugged up with chunks between intervals of product drops. A continuous purge flow of nitrogen in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, quick change of gas composition, selective use of static-neutralizing chemicals, and surface passivation with aluminum alkyls.

Static can also be controlled by using small amounts of an inert conductive particulate material such as carbon black. The amount of inert particulate material is that which is sufficient to control static. Carbon black is the preferred antistatic material. The mean particle size of the inert conductive particulate material is in the range of about 0.01 to about 150 microns, preferably to about 10 microns. The mean particle size can refer to the particle per se or to an aggregate as in the case of carbon black. The carbon black materials employed can have a primary particle size of about 10 to about 100 nanometers and an average size of aggregate (primary structure) of about 0.1 to about 10 microns. The surface area of the carbon black can be about 30 to about 1500 square meters per gram and can display a dibutylphthalate (DBP) absorption of about 80 to about 350 cubic centimeters per 100 grams. It is preferred to treat the particulate material prior to its introduction into the reactor to remove traces of moisture and oxygen. This can be accomplished by purging the material with nitrogen gas, and heating using conventional procedures.

The flow indices of the thermoplastic elastomers of this invention can be in the range of about 0.1 to about 100. Flow index is determined under ASTM D-1238, Condition F, at 190° C. and 21.6 kilograms.

The Mooney viscosity of the polymer product can be in the range of about 10 to about 150 and is preferably about 20 to about 80. The Mooney viscosity is measured by introducing the polyethylene, EPM, or EPDM into a vessel with a large rotor, preheating for one minute at 150° C., and then stirring for four minutes at the same temperature.

As noted above the fluidized bed reactor can be the one described in U.S. Pat. No. 4,482,687 or another conventional reactor for the gas phase production of polyethylene or EPRs. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. A typical cycle gas is comprised of ethylene, nitrogen, hydrogen, and/or alpha-olefin. The process can be carried out in a batch or continuous mode, the latter being preferred. The essential parts of the reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of the cycle gas compressor from upstream to downstream of the cooler and another involves the addition of a vent line from the top of the product discharge vessel (stirred product tank) back to the top of the reactor to improve the fill level of the product discharge vessel.

A particularly advantageous application for the thermoplastic elastomers of this invention is in single ply roofing membranes, which are conventionally used to cover various roof constructions, for example, flat roofs with ballast and mechanical attachments. The membranes are typically about 40 to about 60 mils thick. The use of EPDM membranes for roof coverings and in various other applications is discussed in U.S. Pat. No. 4,589,804. The problem with conventional EPDM or EPM rubbers is that they obviously have no strength above their approximately 40° C. melting point whereas black roof temperatures can exceed 80° C. and white roof temperatures can exceed 50° C. The thermoplastic elastomer of this invention solves this problem. Further, roofing membranes, which incorporate these thermoplastic elastomers into their formulations, are found to be both waterproof and weatherproof, and fully amenable to heat welding. Heat welding of these particular membranes is found to achieve outstanding field seam strength. Thus, not only is the membrane per se waterproof and weatherproof, but the field seams which join the membranes are waterproof and weatherproof as well. Since the seams are the most vulnerable part of single ply roofing, the advantage is obvious.

Single ply roofing membrane formulations, in addition to the thermoplastic elastomer of the invention, typically contain fillers, plasticizer oils, and other additives.

The fillers are selected because of their reinforcement capability, e.g., the addition of 50 parts by weight of a reinforcing filler such as carbon black to 100 parts by weight of an EPDM will increase the tensile strength of the EPDM from about 400 psi to about 4000 psi, a tenfold increase. These fillers are introduced into the formulation in particulate form; the particles can have a size in the range of about 10 to about 500 millimicrons, and preferably have a particle size in the range of about 25 to about 100 millimicrons. Carbon black is generally used where a black roofing membrane is desired. Non-black (mineral) fillers such as precipitated silica, ground silica, clay, magnesium silicate, calcium carbonate, and talc can also be used as well as mixtures of carbon black and the non-black fillers. The fillers can be used in amounts of about 1 to about 200 parts by weight of filler per 100 parts by weight of thermoplastic elastomer, and are preferably included in the formulation in amounts of about 40 to about 120 parts by weight.

Plasticizer oils are preferably included in the roofing membrane formulation. When reinforcing fillers such as carbon black are added to the EPR, the viscosity of the mixture becomes very high, thus reducing the capacity of the mixture to be worked into the roofing membrane. Therefore, unless the viscosity can be reduced, the amount of filler that can be mixed into the EPR is limited. One of the functions of the plasticizer oil is to reduce the viscosity of the mixture. Another function is to soften the polymer. As the plasticizer oil is added to the formulation, the amount of filler can be increased. Examples of plasticizer oils are paraffin oils, naphthenic oils, mineral oils, and liquid polybutene. The plasticizer oils can be used in amounts of about 1 to about 150 parts by weight of oil per 100 parts by weight of filler, and are preferably included in the formulation in amounts of about 30 to about 100 parts by weight.

When plasticizer oils are used in large amounts, e.g., 60 parts by weight per 100 parts by weight of elastomer or more, there can be a problem with bleed-out. Bleed-out interferes with the appearance of the membrane and its use in heat welding. Bleed-out can be reduced or eliminated by introducing oil adsorbing mineral fillers such as kaolin clay or oil adsorbing polymers such as EPDM into the membrane in sufficient amounts to adsorb the oil. The amount of oil adsorbent filler or polymer can be in the range of about 1 to about 120 parts by weight of adsorbent per 100 parts by weight of oil, and is preferably in the range of about 10 to about 80 parts by weight. Where oil adsorbing fillers or polymers are already present in the membrane composition, there may be no need for additional oil adsorbing materials.

In addition to the components mentioned above, the roofing membrane formulation can contain various conventional additives such as antioxidants, processing aids, and light stabilizers. These additives are generally incorporated into the formulation in a total amount of about 0.5 to about 5 parts by weight per 100 parts by weight of thermoplastic elastomer.

Advantages of the roofing membrane formulation described above and the roofing membrane made from the formulation are compounding latitude; Banbury™ mixing; calendering temperatures up to 143° C.; heat weldable; easy lay down; good deformation resistance; low temperature flexibility; high temperature integrity; installation temperature range as low as 4° C.; weatherability; and retention of physical strength, other mechanical properties, and elastomeric properties at temperatures as low as minus 55° C. and as high as 100° C.; capable of incorporating high levels of reinforcing fillers and plasticizer oil (to approximately equivalent weight ratios); and good heat aging, ozone resistance, and tear, cut, and set resistance.

In addition to the roofing application mentioned above, the thermoplastic elastomer of the invention is advantageously used in waterproof and weatherproof sheeting or covering, hose, tubing, seals, rub strips, roll covers, gaskets, panels, trim, insulation, weatherstripping, glazing, wire and cable, underhood and inside automotive applications, and general rubber applications.

One other important application for the thermoplastic elastomer of this invention is as a modifier for bitumen and asphalt, which are both used in roofing and road construction. Mixtures can contain about 1 to about 100 parts by weight of thermoplastic elastomer for each 100 parts by weight of bitumen or asphalt.

The patents mentioned in this specification are incorporated by reference herein.

The invention is illustrated by the following examples.

EXAMPLES 1 TO 5

The EPRs can be prepared by the following processes:

A. 3 lbs of carbon black are charged into an open reactor, which is then pressurized to 350 psig (pounds per square inch gauge) with nitrogen for a leak check via pressure decay. After about 15 minutes, the reactor is vented to the atmosphere and then repressurized to 100 psig with nitrogen. Temperature is then adjusted to achieve a reactor temperature in excess of 80° C., and 3 pounds per hour of nitrogen is passed through the reactor to remove volatile contaminants.

About 12 hours later, the reactor is pressurized to 350 psig with nitrogen for a leak test via pressure decay. Following this, the reactor is pressure purged twice to 100 psig with nitrogen. 240 milliliters of 10 weight percent DEAC (diethylaluminum chloride) in isopentane (128 millimoles of aluminum) is then charged to the reactor to scavenge impurities bound to the carbon black. Following two more 100 psig pressure purges, the reactor temperature is adjusted down to 30° C. in preparation for the polymerization. The polymerization pressure is 350 psig. Nitrogen, ethylene, propylene, and hydrogen are then charged to the reactor. The C3/C2 molar ratio is 1.1. The H2/C2 molar ratio is 0.06. The ethylene partial pressure is 100 psig. 20 milliliters of ENB (ethylidene norbornene) is also charged to the reactor. In weight percent, the ENB fed is 4.2. In addition, 18 milliliters of 20 weight percent ETCA (ethyl trichloroacetate) solution in isopentane is charged to establish an initial level.

A catalyst precursor prepared according to U.S. Pat. No. 4,508,842 is fed to the reactor continuously at a rate corresponding to about 2 millimoles of vanadium per hour; 0.5 pound per hour of nitrogen is used to convey the catalyst precursor through a dedicated port in the reactor. The catalyst precursor is the reaction product of vanadium trichloride and tetrahydrofuran impregnated together with a DEAC modifier into a silica support. DEAC cocatalyst (10 weight percent DEAC in isopentane) and ETCA promoter (20 weight percent ETCA solution in isopentane ) are also fed to the reactor with an Al/V molar ratio of about 24 and a DEAC/ETCA molar ratio of about 1.7. The overall Al/V molar ratio is 36 and Al/ETCA molar ratio is 2.5. Monomers and hydrogen are fed to maintain gas composition, while ENB is fed in proportion to the polymerization rate to maintain a constant weight percentage in the bed. A continuous vent stream is used to keep nitrogen added with the catalyst precursor from accumulating.

When the desired batch weight is obtained, the reactor is vented and then purged four times to 100 psig with nitrogen to remove flammables. Zinc oxide is then added to the reactor in an amount corresponding to 1 mole of Zn per Cl in the resin, and 0.2 weight percent BHT is added to protect the resin from oxidation prior to compounding. A sample for physical testing is then washed in isopropanol and then dried in flowing nitrogen to remove unreacted ENB.

B. Process A is repeated except that 9 milliliters of 20 weight percent ETCA solution in isopentane is charged to establish the initial level; the catalyst precursor is fed at a rate corresponding to about 2.7 millimoles of vanadium per hour; DEAC cocatalyst and ETCA promoter are fed with an Al/V molar ratio of about 20 and a DEAC/ETCA molar ratio of about 2.5; the H2/C2 molar ratio is about 0.14; the ENB feed in weight percent is 3.9; the overall Al/V molar ratio is 30; and the overall Al/ETCA molar ratio is 3.6.

The resin properties are set forth in Table I.

The process A catalyst system is used to prepare the resins for these examples. The variables and the results for examples 1 to 5 and the following examples 6 to 9 are set forth in Table II.

EXAMPLE 6

A sample is produced in a 14 inch (outer diameter) fluidized bed reactor. The reaction is catalyzed using a silica supported vanadium trichloride catalyst precursor with a vanadium content of 2.05 percent. The precursor contains 3.3 weight percent tetrahydrofuran and 2.2 weight percent aluminum. The aluminum is introduced as diethylaluminum chloride (DEAC). The precursor is prepared in accordance with U.S. Pat. No. 4,508,842.

The general reaction conditions during the production of this sample include a fluidized bed temperature of 50° C., a total reactor pressure of 300 psig, and an ethylene partial pressure of 61 psia where propylene is fed as the comonomer. The propylene/ethylene molar ratio during the production of this sample is 0.322 while the hydrogen/propylene ratio is 0.0025. A 10 percent by weight solution of triisobutylaluminum (TIBA) in isopentane is fed to the fluidized bed as a cocatalyst. The concentration of the TIBA in the resin based on production rate is 780 ppmw (parts per million by weight). A 10 percent by weight solution of tetrachlorodifluoroethane promoter in isopentane is also fed to the fluidized bed at an approximate rate of 120 cubic centimeters per hour. The average residence time for the resin is 3.5 hours at an average production rate of 24 pounds per hour. The approximate bed weight in the reactor is 84 pounds. The reactor's space time yield is 4 pounds per hour per cubic foot of reactor volume. A superficial gas velocity of 1.9 feet per second is used during the production of this sample.

The resin made using the above conditions has a density of 0.8810 gram per cubic centimeter and a flow index of 1.63 gram per 10 minutes. The resin's bulk density is 19 pounds per cubic foot. Particle size data indicates the resin has an average particle size of 0.0254 inch with only 0.6 weight percent smaller than 120 mesh. The resin is stabilized with 300 parts per million of antioxidant.

EXAMPLE 7

A sample resin is produced in a 18 inch (outer diameter) fluidized bed reactor. The reaction is catalyzed using a vanadium trichloride/tetrahydrofuran/DEAC catalyst precursor supported on silica with a vanadium content of 1.9 weight percent. Carbon black beads are fed to the reactor to improve operability. The average carbon content of the resin is approximately 2.1 wt %. The precursor is prepared in accordance with U.S. Pat. No. 4,508,842.

The general reaction conditions during the production of this EPM sample includes a fluidized bed temperature of 60° C., a total reactor pressure of 300 psig, and an ethylene partial pressure of 120 psia using propylene as a comonomer. The propylene/ethylene molar ratio during the production of this sample is 0.31 while the hydrogen/propylene molar ratio is 0.0024. A 20 percent by weight solution of tri-isobutylaluminum (TIBA) in isopentane is fed to the fluidized bed as a cocatalyst. The concentration of the TIBA in the resin based on production rate is approximately 1100 ppmw. Neat chloroform is also fed to the fluidized bed at an approximate rate of 10 cubic centimeters per hour giving an average concentration based on production rate of 860 ppmw. The average residence time for the resin is 3 hours at an average production rate of 38 pounds per hour. The average bed weight in the reactor is 118 pounds. The reactor's space time yield is 4.8 pounds per hour per cubic foot of reactor volume. A superficial gas velocity of 2.26 feet per second is used during the production of this sample.

The resin made using the above conditions has a density of 0.8904 gram per cubic centimeter and a flow index of 2.33 grams per 10 minutes after correction for the carbon content of the resin. The resin's average bulk density is 22.8 pounds per cubic foot. The average particle size of the resin is 0.0407 inch where approximately 3.2 percent by weight of the resin is smaller than 120 mesh while 11.2 percent by weight of the resin is larger than 6 mesh. The resin is purged with nitrogen and stabilized with a dry stabilization package including antioxidants in a Summix™ mixer in two separate batches. The blend time for the first batch is 1 hour while the second batch is blended overnight. The second batch appears to be more uniform on discharge than the first batch, and is the sample tested.

EXAMPLE 8

The copolymer of this example is used in a white thermoplastic heat welding formulation. The resin is found to have good heat welding capability, good retention of properties at elevated roof temperatures, and excellent retention of physical properties and appearance after 4,000 hours accelerated weather aging. Nearly 100 percent of tensile strength and elongation are retained.

The sample is produced in a 14 inch (outer diameter) fluidized bed reactor. The reaction is catalyzed using a titanium based spray dried catalyst. The catalyst is prepared in accordance with U.S. Pat. No. 5,290,745.

The general reaction conditions during the production of this sample include a fluidized bed temperature of 55° C., a total reactor pressure of 330 psig, and an ethylene partial pressure of 35 psia where butene is fed as the comonomer. The butene/ethylene molar ratio during the production of this sample is 1.10 while the hydrogen/propylene ratio is 0.010. Triethylaluminum (TEAL) is fed to the fluidized bed as a cocatalyst.

The average residence time for the resin is 3.6 hours at an average production rate of 26 pounds per hour. The approximate bed weight in the reactor is 110 pounds. The reactor's space time yield is 3.7 pounds per hour per cubic foot of reactor volume. A superficial gas velocity of 2.2 feet per second is used during the production of this sample.

The resin made using the above conditions has a density of 0.8842 gram per cubic centimeter and a flow index of 3.9 grams per 10 minutes. The resin is stabilized with 500 ppm BHT (butylated hydroxytoluene) and 500 ppm antioxidant.

EXAMPLE 9

A high crystallinity commercial EPDM rubber formulation is tested in a simulated roofing environment. The EPDM rubber is one of the highest crystallinity commercial EPDMs at about 10 weight percent crystallinity, peaking at about 50° C., but it has no crystallinity above 60° C. This material, as typical of EPDM rubber polymers, has no high melt crystallinity. Physical properties at roof temperatures up to 80° C. in this unvulcanized formulation is found to be inferior to formulations of the above examples.

TABLE I

| Process | A |
|---|---|
| flow index (g/10 min) | — |
| propylene (wt %) | 19.9 |
| ENB (wt %) | 2.6 |
| batch weight (pounds) | 12.4 |
| carbon black (wt %) (material balance) | 23 |

TABLE II

| | Example | | | | | | | | |
|---|---|---|---|---|---|---|---|---|---|
| | 1 | 2 | 3 | 4 | 5 | 6 | 7 | 8 | 9 |
| C2 (mol %) | 83.4 | 87.6 | 84.8 | 86.1 | 82.6 | 86.4 | 84.2 | 88.9 | 82.6 |
| C3 (mol %) | 15.4 | 12.4 | 14.5 | 13.1 | 17.4 | — | 15.8 | — | — |
| C4 (mol %) | — | — | — | — | — | 13.6 | — | 11.1 | 1.0 |
| ENB (mol %) | 1.2 | — | 0.7 | 0.8 | — | — | — | — | — |
| C3/C2 feed (mol ratio) | 1.1 | 1.0 | 1.1 | 1.1 | — | — | 0.3 | 1.1 | — |
| C2 (wt %) | 74.7 | 82.5 | 77.5 | 78.8 | 76 | 79 | 78 | 80 | 78 |
| C3 (wt %) | 20.8 | 17.5 | 19.9 | 18 | 24 | — | 22 | — | 22 |
| C4 (wt %) | — | — | — | — | — | 21 | — | 20 | — |
| ENB (wt %) | 4.5 | — | 2.6 | 3.2 | — | — | — | — | 4.0 |
| FI (g/10 min) | 1.1 | 37 | no flow | 0.6 | 16 | 1.5 | 2.5 | 3.9 | 3.3 |
| low melt temp (°C.) | 42 | 45 | 42 | 42 | 49 | 49 | 47 | 50 | 46 |
| high melt temp (°C.) | 123 | 121 | 121 | 123 | 123 | 123 | 70 to 120 | 120 | — |
| HM/LM | 3.5 | 1.5 | 1.3 | 2.0 | 0.8 | 1.0 | 1.8 | — | 0.0 |
| cryst. (wt %) | 22 | 28 | 19 | 21 | 20 | 18 | — | — | 11 |
| high melt | 17.0 | 16.7 | 10.6 | 14.0 | 8.7 | 9.1 | 11.4 | — | 0.0 |

TABLE II-continued

| | | | | | | | | | |
|---|---|---|---|---|---|---|---|---|---|
| cryst. (wt %) | | | | | | | | | |
| low melt cryst. (wt %) | 4.9 | 11.1 | 8.1 | 7.0 | 10.9 | 9.1 | 6.5 | — | 11 |

Properties of molded formulation of 100 parts by weight of each of the above copolymers; 100 phr carbon black; and 60 phr paraffin oil:

| | | | | | | | | | |
|---|---|---|---|---|---|---|---|---|---|
| 100% modulus (psi) | 780 | 610 | 610 | — | — | 520 | 560 | — | — |
| 200% modulus (psi) | 990 | 750 | 880 | — | — | 740 | 740 | — | — |
| 300% modulus (psi) | 1150 | 880 | 1080 | — | — | 950 | 920 | — | — |
| tensile strength (psi) | 1370 | 1050 | 1320 | — | — | 1290 | 1140 | — | — |
| elongation (%) | 465 | 490 | 460 | — | — | 500 | 480 | — | — |
| retention of tensile strength at 70° C. | fair | fair | fair | — | — | good | good | — | — |
| retention of elongation at 70° C. | good | fair to good | good | — | — | good | good | — | — |

Properties of molded formulation of 100 parts by weight of the above example 8 copolymer; 15 phr of mineral oil; 40 phr rutile titanium dioxide; 15 phr clay; 5 phr magnesium silicate; 10 phr amorphous silica; 1.8 phr antioxidants and stabilizers; and 0.5 phr UV absorbers are as follows:

| | |
|---|---|
| 100 percent modulus (psi) | 400 |
| 200 percent modulus (psi) | 410 |
| 300 percent modulus (psi) | 430 |
| tensile strength (psi) | 1390 |
| elongation (percent) | 880 |
| retention of tensile strength at 70° C. | good |
| retention of elongation at 70° C. | good |
| retention of properties after 4000 hours (accelerated xenon arc Weatherometer ™ device aging) | excellent (nearly 100 percent retention of tensile strength and elongation) |

Notes to examples and Tables:

1. C2(mol %)=mol percent of ethylene.

2. C3(mol %)=mol percent of propylene.

3. C4(mol %)=mol percent of 1-butene.

4. ENB=ethylidene norbornene.

5. ENB(mol %)=mol percent of ENB.

6. C3/C2 feed (mol ratio)=mol ratio of propylene to ethylene in feed.

7. C2(wt %)=the percent by weight ethylene based on the weight of the copolymer.

8. C3(wt %)=the percent by weight propylene based on the weight of the copolymer.

9. C4(wt %)=the percent by weight 1-butene based on the weight of the copolymer.

10. ENB(wt %)=the percent by weight ENB based on the weight of the EPR.

11. FI(g/10 min)=flow index in grams per 10 minutes. Flow index is determined under ASTM D-1238, Condition F, at 190° C. and 21.6 kilograms.

12. low melt temp(° C.)=melting temperature(s) of the low melt crystallinity in ° C.

13. high melt temp(° C.)=melting temperature of the high melt crystallinity in ° C.

14. HM/LM=the weight ratio of high melt crystallinity to low melt crystallinity.

15. cryst.(wt % )=the percent by weight of the crystalline phase of the EPR based on the weight of the EPR. Crystallinity is determined using a Differential Scanning Calorimeter(DSC).

16. high melt cryst.(wt %)=the percent by weight of the high melt crystallinity based on the weight of the crystalline phase of the EPR.

17. low melt cryst.(wt %)=the percent by weight of the low melt crystallinity based on the weight of the crystalline phase of the EPR.

18. 100% modulus, 200% modulus, 300% modulus, and tensile strength are determined in pounds per square inch (psi) under ASTM D-412 at a rate of 20 inches per minute.

19. Elongation(%)=the percent elongation determined under ASTM D-412 at a rate of 20 inches per minute.

20. Retention of tensile strength is determined at 70° C. under ASTM D-412 at a rate of 20 inches per minute.

21. Retention of elongation is determined at 70° C. under ASTM D-412 at a rate of 20 inches per minute.

22. phr=parts by weight per 100 parts by weight of copolymer.

We claim:

1. A membrane comprising (i) a thermoplastic elastomer consisting essentially of a copolymer comprising a mixture of ethylene; one or more alpha-olefins having 3 to 12 carbon atoms; and, optionally, a diene, said copolymer being in an uncrosslinked state and having a crystallinity in the range of about 2 to about 40 percent by weight based on the weight of the copolymer wherein about 15 to about 85 percent by weight of the crystallinity melts at a temperature above 80° C.; about 15 to about 85 percent by weight of the crystallinity melts at a temperature below 80° C.; and the crystalline melting temperatures differ by at least about 30° C.; (ii) a filler; and (iii) a plasticizer oil.

2. A mixture comprising bitumen or asphalt and a thermoplastic elastomer consisting essentially of a copolymer comprising a mixture of ethylene; one or more alpha-olefins having 3 to 12 carbon atoms; and, optionally, a diene, said copolymer being in an uncrosslinked state and having a crystallinity in the range of about 2 to about 40 percent by weight based on the weight of the copolymer wherein about 15 to about 85 percent by weight of the crystallinity melts at a temperature above 80° C.; about 15 to about 85 percent by weight of the crystallinity melts at a temperature below 80° C.; and the crystalline melting temperatures differ by at least about 30° C.

3. The membrane defined in claim 1 wherein the filler is present in an amount of about 1 to about 200 parts by weight per 100 parts by weight of elastomer and the plasticizer oil is present in an amount of about 1 to about 150 parts by weight per 100 parts by weight of filler.

4. A roof having disposed thereon the membrane defined in claim 1.

5. A roof having disposed thereon two or more membranes heat welded to each other, each membrane being the membrane defined in claim 3.

\* \* \* \* \*